United States Patent
Findlan et al.

(10) Patent No.: US 6,211,482 B1
(45) Date of Patent: Apr. 3, 2001

(54) APPARATUS AND METHOD FOR PRECISION EXCAVATION AND WELDING OF THICK-WALLED COMPONENTS

(75) Inventors: Shane J. Findlan; Gregory J. Frederick, both of Harrisburg; Artie G. Peterson, Jr., Locust; J. Darryl Baucom, Charlotte, all of NC (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 0 days.

(21) Appl. No.: 08/957,042

(22) Filed: Oct. 24, 1997

(51) Int. Cl.[7] ............................ B23H 1/00; B23H 7/26; B23K 26/34
(52) U.S. Cl. ............... 219/69.17; 219/69.2; 219/121.63; 219/121.64; 376/260
(58) Field of Search .................. 219/69.17, 69.2, 219/121.63, 121.64; 376/260

(56) References Cited

U.S. PATENT DOCUMENTS

| | | | |
|---|---|---|---|
| 5,359,172 | 10/1994 | Kozak et al. | 219/121.64 |
| 5,361,285 | * 11/1994 | Formanek | 376/260 |
| 5,408,883 | * 4/1995 | Clark, Jr. et al. | 376/260 |
| 5,443,201 | * 8/1995 | Cartry | 376/260 |
| 5,514,849 | 5/1996 | Findlan et al. | 219/121.63 |
| 5,543,599 | * 8/1996 | Cole et al. | 219/69.2 |
| 5,818,006 | * 10/1998 | Habel et al. | 219/69.17 |
| 5,966,308 | * 10/1999 | Kazirskis et al. | 376/260 |

FOREIGN PATENT DOCUMENTS

| | | | |
|---|---|---|---|
| 6-182627 | * | 7/1994 | (JP) . |
| 7-51947 | * | 2/1995 | (JP) . |

OTHER PUBLICATIONS

Ammirato et al., "Inconel 600 Reactor Pressure Vellel Head Penetration Demonstration", EPRI Workshop on PWSCC of Alloy 600 in PWRS, Nov. 15–17, 1994, Tampa, Florida.

"ROMAN™" Product Literature, Babcock & Wilcox Nuclear Technologies, 1994.

"EDM Principles", Hansvedt Operators Manual, pp. 2–1 through 2–16, 1983.

* cited by examiner

Primary Examiner—Geoffrey S. Evans
(74) Attorney, Agent, or Firm—William S. Galliani; Pennie & Edmonds LLP

(57) ABSTRACT

A method of repairing a substrate includes the step of excavating a well in the substrate with an electrical discharge machining operation. A wire is then delivered to the well. Simultaneously, laser energy is routed to the well such that the laser energy intersects with the wire to produce a reconstruction weld in the well. A tool delivery system with an electrical discharge machining tool head and a reconstruction welding tool head is used to perform the excavation and welding operations.

11 Claims, 7 Drawing Sheets

APPARATUS AND METHOD FOR PRECISION EXCAVATION AND WELDING OF THICK-WALLED COMPONENTS

BRIEF DESCRIPTION OF THE INVENTION

This invention relates generally to the repair of thick-walled components susceptible to corrosion, such as reactor pressure vessel control rod drive mechanisms in pressurized water reactor nuclear power plants. More particularly, the present invention relates to a technique for repairing such thick-walled components through precision excavation and welding.

BACKGROUND OF THE INVENTION

A number of technologies have been developed to repair corroded or damaged thin-walled, small diameter tubes used in applications such as heat exchangers or material transport systems. U.S. Pat. Nos. 5,430,270; 5,514,849; 5,430,270; 5,656,185; 5,573,683; and 5,653,897 disclose technologies of this type. Each of these patents is owned by the assignee of the present invention and is incorporated by reference herein. FIG. 1 illustrates an apparatus described in several of the foregoing patents. In particular, the figure illustrates a rotating apparatus 20 used to repair damaged tubes. A rotating welding head 22 is fixedly positioned at the end of a rotating sleeve 24.

A rotating drive mechanism 25 rotates the sleeve 24, thus the rotating sleeve 24 and the rotating welding head 22 synchronously rotate. The rotating drive mechanism 25 simultaneously rotates a filler assembly 26 that includes a filler metal receptacle 28 and a filler metal delivery system 30. The filler metal receptacle 28 holds the filler metal to be welded. Generally, the filler metal receptacle 28 will be in the form of a reel of filler metal wire. The filler metal delivery system 30 receives the filler metal and delivers it to a filler passage within the rotating sleeve 24. Since the rotating sleeve 24 and the filler assembly 26 rotate synchronously, the filler metal does not become tangled.

The filler metal delivery system 30 is powered through filler assembly slip rings 32. The speed of the wire feed motor can be varied to permit different wire feed speeds, providing control of clad thickness and to allow adjustment for variations in laser output levels, travel speed, rotational pitch, and other factors.

The rotating apparatus 20 also includes a gas coupler 36 that is connected to a gas supply 38. The rotating sleeve 24 includes a rotating fiber optic cable 40. A laser 44 supplies energy to a fixed fiber optic cable 43. The laser energy is transferred from the fixed fiber optic cable 43 to the rotating fiber optic cable 40 through an optical coupler 42.

The rotating apparatus 20 is moved along its longitudinal axis by an axial drive system 50 mounted on shaft 51. Guide rollers 49 may be used to guide the rotating sleeve 24 into position. A computer controller 53 is used to control the operation of the rotating apparatus drive mechanism 25, the axial drive system 50, and the filler metal delivery system 30. In particular, the computer controller 53 is used to set the speed of the rotating apparatus drive mechanism 25, the position for the axial drive system 50, and the filler delivery rate for the filler metal delivery system 30.

The operation of the rotating apparatus 20 is more fully appreciated with reference to FIG. 2, which provides an enlarged cross-sectional view of the rotating welding head 22. The rotating welding head 22 includes a body 80, which defines a filler passage 86. The filler passage 86, also called the wire conduit runs the length of the rotating sleeve 24. Filler 88 is forced from the filler metal delivery system 30 through the filler passage 86 to a body aperture 94. The laser energy is delivered through the body aperture 94 and welds the filler 88. Gas conduit 89 delivers a shielding gas to the welding head 22. Preferably, the gas conduit 89 terminates in distribution channels that distribute the gas to the aperture 94 at a number of locations.

FIG. 2 also depicts the rotating fiber optic cable 40 positioned within the body 80 of the rotating welding head 22. The rotating fiber optic cable 40 runs the length of the rotating sleeve 24 and is affixed thereto.

The rotating fiber optic cable 40 terminates at a laser energy directional modification assembly 92. Preferably, the assembly 92 is implemented as an optical assembly. FIG. 3 discloses an assembly 92 that includes an input lens assembly 96, a wedge prism 97, and an output lens assembly 98. The wedge prism 97 serves to change the direction of the laser energy. Preferably, the laser energy is directed toward the receiving surface 99 at a non-orthogonal angle θ. When the laser energy is impinged upon a surface to be welded at an angle, of say 45°, as shown in FIG. 3, then reflective laser energy does not disrupt the incoming laser energy.

The device of FIGS. 1–3 has been used for clad weld repair of thin-walled (e.g., 0.05 inches thick) heat exchanger tubes. The device can also be used for fusing defects by melting and re-solidifying the metal of a thin-walled heat exchanger tube.

Most corrosion in pressurized water reactors has been associated with thin-walled heat exchanger tubes. However, there have been recent reports of water stress corrosion cracking in reactor pressure vessel control rod drive mechanisms. FIG. 4 illustrates a prior art reactor vessel dome 110 with a set of control rod drive mechanism (CRDM) nozzles 112. A prior art repair system is positioned underneath the reactor vessel dome 110. The prior art repair system includes a tool delivery system 114, which supports a tool arm 116 that has a tool head 118 positioned at its end. The tool delivery system 114 executes radial motion as shown with line 120, rotational motion as shown with arc 122, and lift motion as shown with line 124. These motions are used to deliver the tool head 118 to different locations in a CRDM nozzle 112 so that repairs can be effectuated.

A variety of tool heads 118 are used to effectuate repairs. A detection probe that uses eddy current techniques may be used to identify flaws in the CRDM nozzle 112. Similarly, a detection probe that uses ultrasonic testing may be used to identify flaws in the CRDM nozzle 112. A detection probe to execute dye penetrant examinations may also be used. Such a probe is used to verify information found from other detection techniques and to examine completed weld repairs.

An excavation tool may also be used as a tool head 118. Prior art excavation tools generally rely upon milling, grinding, or cutting tools. Such tools typically require large motor power that is difficult to deliver to remote locations, such as CRDM nozzles. Another class of prior art excavation tools relies upon a welding mechanism to melt damaged surface areas. The problem with this approach is that it is rather difficult to handle the molten metal that is removed from the damaged surface areas. Both of the foregoing excavation techniques also share the shortcoming that they are imprecise and therefore result in relatively large and unnecessary excavations that must be reconstructed.

A cavity repair weld head may be used for reconstruction operations. Such a weld head is used to fill the excavated area with a filler material, such as weld beads. Alternately, an arc welding cavity repair weld head may be used. For example, a gas-tungsten arc welding tool may be used.

A boring tool head may also be used as a tool head 118. A boring tool is used to bore the weld buildup after a weld repair. This allows the nozzle 112 to be returned to original design specifications.

As indicated above, one problem with prior art excavation tools is that they are imprecise and therefore produce relatively large excavations. Consequently, relatively voluminous reconstruction operations must be performed. This can result in high residual stresses and welding distortion, which may promote future cracks. Another problem arises when welding excavation operations produce a molten metal byproduct that is difficult to dispose. Finally, prior art techniques require a relatively large number of tool heads. It would be desirable to reduce the number of tool heads required to effectuate a repair.

In view of the foregoing, it would be highly desirable to provide an improved technique for repairing thick-walled components susceptible to corrosion, such as reactor pressure vessel control rod drive mechanisms in pressurized water reactor nuclear power plants. Such a technique should provide precision excavations to reduce the amount of reconstruction required. Further, such a technique should provide precision reconstruction welding operations to reduce residual stresses and welding distortion. Ideally, the technique would not produce a molten byproduct and would reduce the number of tool heads required to effectuate a repair.

SUMMARY OF THE INVENTION

The invention includes a method of repairing a substrate by excavating a well in the substrate with an electrical discharge machining operation. A wire is then delivered to the well. Simultaneously, laser energy is routed to the well such that the laser energy intersects with the wire to produce a reconstruction weld in the well. A tool delivery system with an electrical discharge machining tool head and a reconstruction welding tool head is used to perform the excavation and welding operations.

The technique of the invention achieves a precision excavation. Thus, when repairing a CRDM nozzle, less radioactive material needs to be disposed. Further, the radioactive material is in the form of dust, not a molten metal, so it is easier to handle. In addition, the precision excavation reduces the welding volume and the amount of filler material required for a repair. The precision welding eliminates the need for an additional step involving a boring tool head. The invention reduces the residual stresses and welding distortion resulting from a weld repair. The technique also provides corrosion protection to prevent future degradation.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 5:
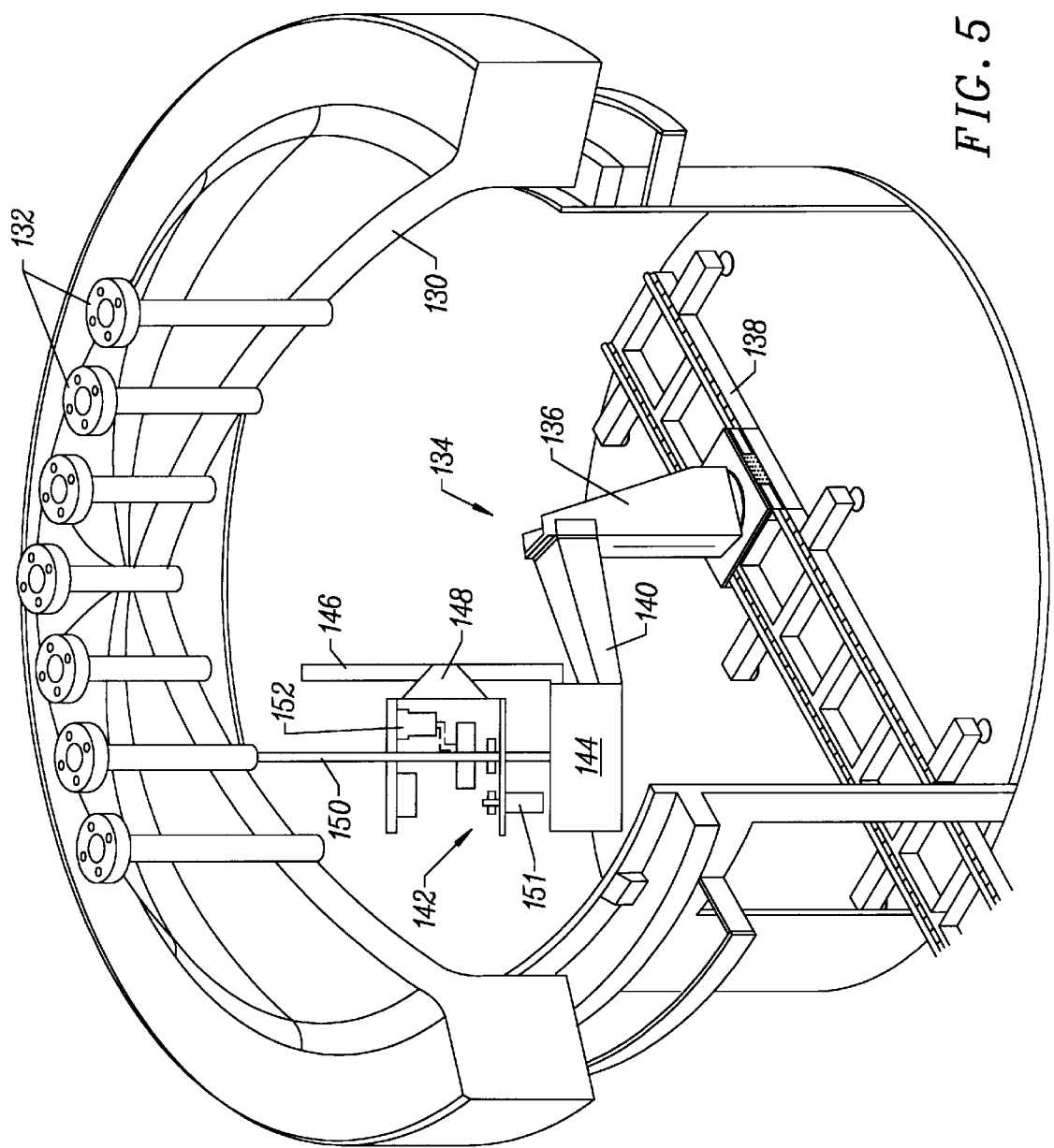
FIG. 5 illustrates a reactor vessel dome and a tool delivery system in accordance with the invention that is used to repair it.

FIG. 5 illustrates a reactor vessel dome 130 and its accompanying CRDM nozzles 132. The CRDM nozzles 132 are an example of a thick-walled component. As used herein, the term "thick-walled" means a substrate that is not practically amenable to repair by remelting operations. For example, heat exchanger tubes are thin-walled devices that are typically 0.050 inches thick. Thus, it is practical to repair such tubes by melting and restoring 80% of the tube wall thickness. On the other hand, thick-walled devices, such as reactor pressure vessel walls are ½ inch or thicker. Thus, it is impractical to remelt a wall of this type. In other words, due to the considerably thicker material, it is not practical for a laser welding method to melt a majority of the wall thickness and then provide filler material to provide an effective repair.

FIG. 5 illustrates a tool delivery system 134. In accordance with the invention, the tool delivery system 134 operates to deliver an electrical discharge machining (EDM) tool head and a laser reconstruction welding tool head. Preferably, prior art tool heads are also used in connection with the tool delivery system 134. For example, an eddy current detection probe tool head, an ultrasonic detection probe tool head, and a dye penetrant tool head may also be used with the tool delivery system 134. The tool delivery system 134 is disclosed by way of example. A variety of tool delivery systems may be used with the prior art tool heads and the tool heads of the present invention.

The tool delivery system 134, by way of example, includes a primary positioning mechanism 136 to execute lift and rotational motion. The primary positioning mechanism 136 is positioned on a belted track 138, which is used to provide radial motion. The tool delivery system 134 includes a horizontal support arm 140. In one embodiment of the invention, a rotating apparatus 142 is positioned on the horizontal support arm 140.

Figure 1:
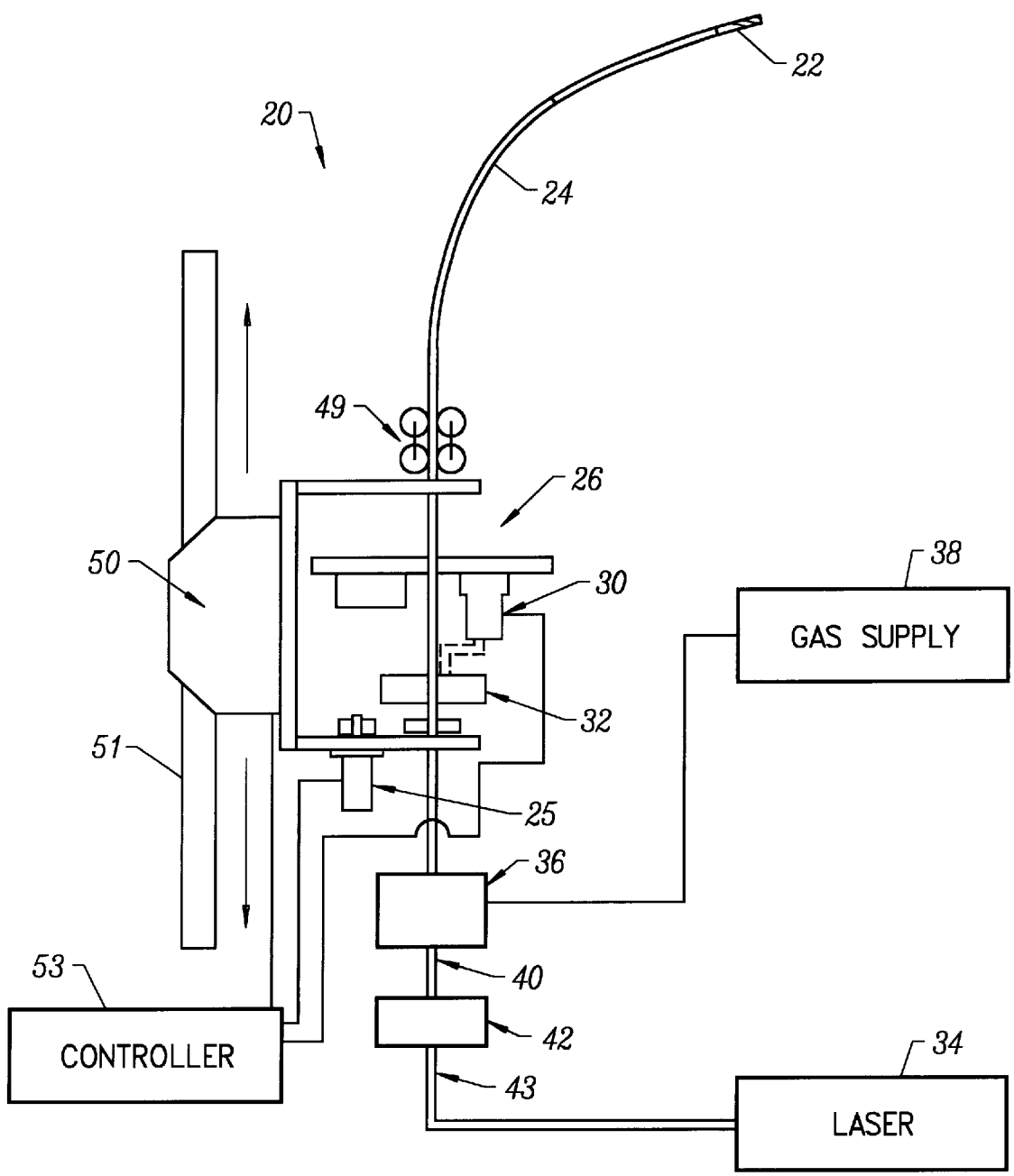
FIG. 1 illustrates a prior art rotating welding apparatus.
Figure 2:
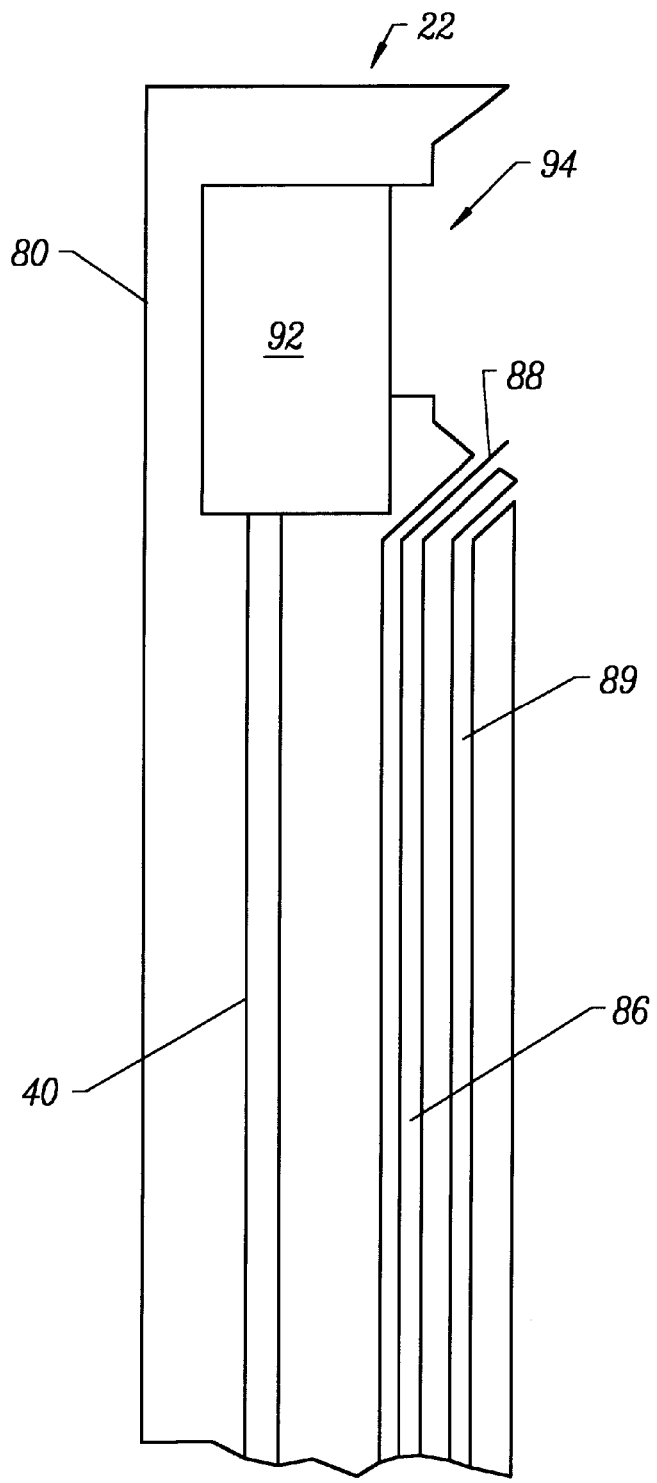
FIG. 2 illustrates a weld head that may be used with the apparatus of FIG. 1.
Figure 3:
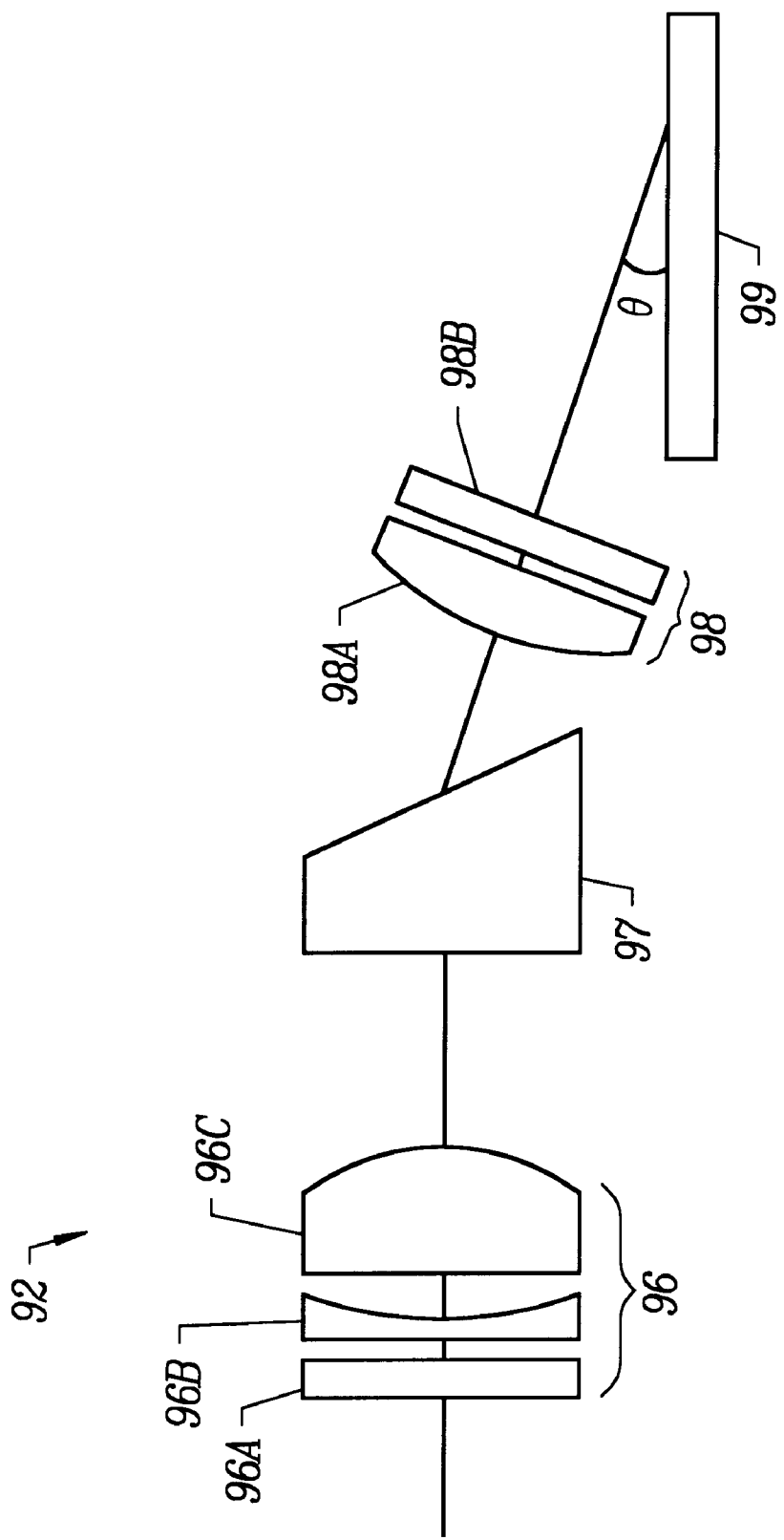
FIG. 3 illustrates a laser energy directional modification assembly that may be used with the apparatus of FIG. 1.
Figure 4:
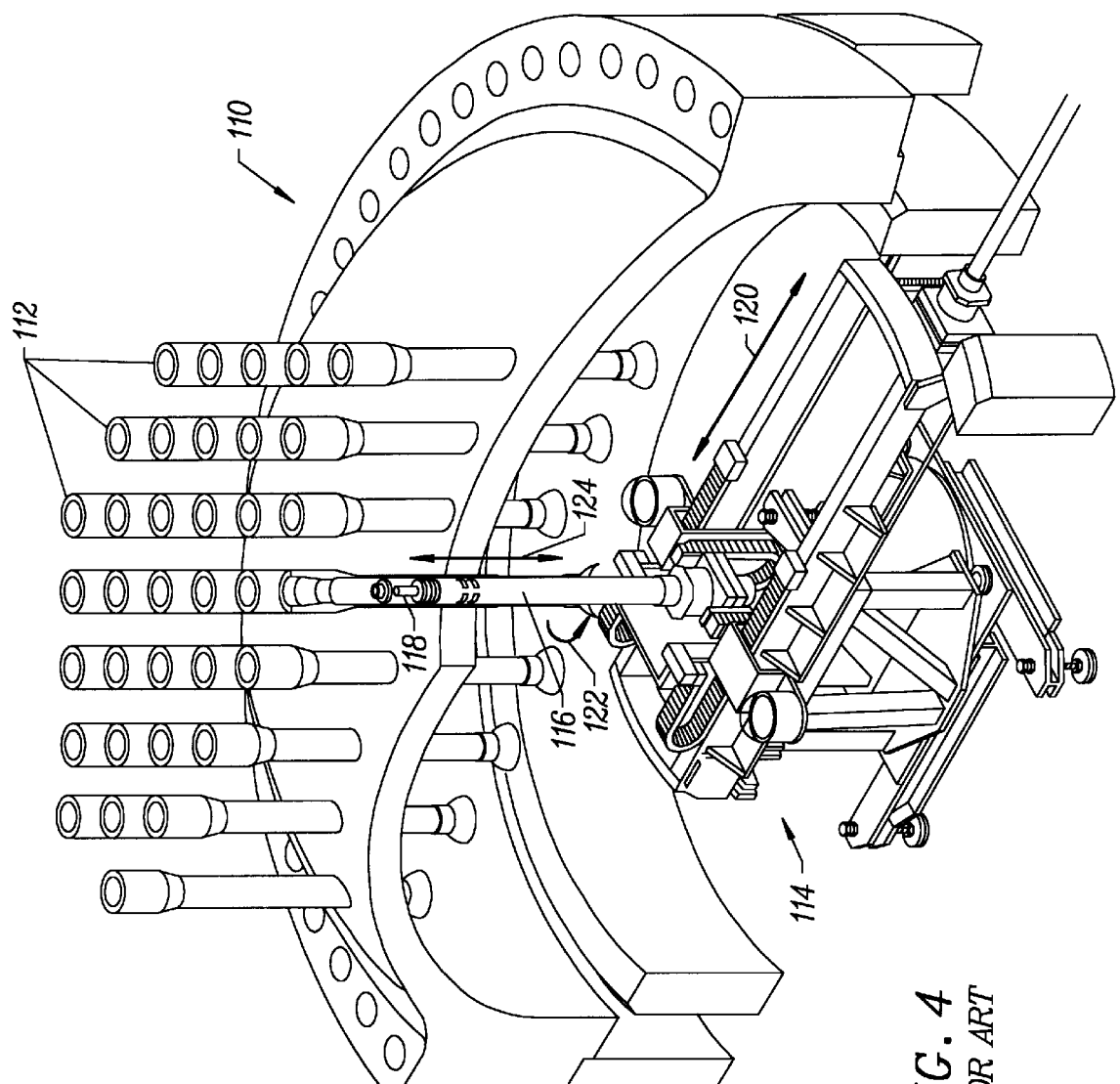
FIG. 4 illustrates a reactor vessel dome and a prior art tool delivery system used to repair it.

The rotating apparatus 142 includes a housing 144, which encloses a gas coupler, gas supply, optical coupler, laser, and computer controller. The rotating apparatus 142 also includes a shaft 146 and a local axial lift mechanism 148. The rotating apparatus 142 also includes a rotating sleeve or tool arm 150. A rotating drive mechanism 151 and a filler metal delivery system 152 are also associated with the rotating apparatus 142. As discussed below, the rotating sleeve or tool arm 150 may be operated without rotation. In sum, the rotating apparatus 142 is consistent with the device described in reference to FIG. 1.

Figure 6:
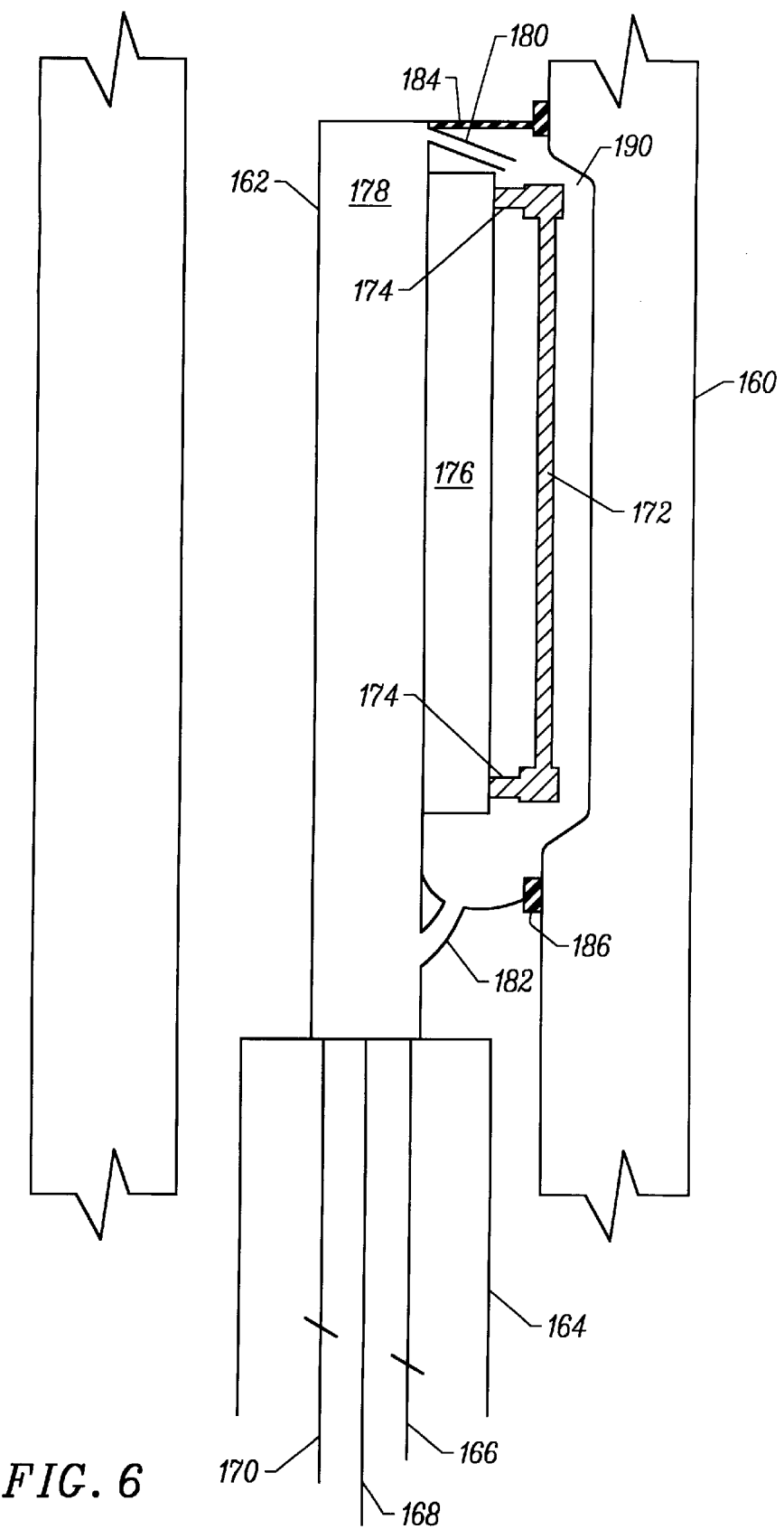
FIG. 6 illustrates an electrical discharge machining tool head used in accordance with an embodiment of the invention.

FIG. 6 illustrates a thick-walled substrate 160, which may be, for example, a CRDM nozzle. The figure also illustrates an electrical discharge machining (EDM) tool head 162 constructed in accordance with an embodiment of the invention. The EDM tool head 162 is positioned on top of a EDM tool arm 164. The EDM tool arm 164 may be the previously discussed rotating sleeve 150 or a similar device. The EDM tool arm 164 preferably includes high voltage signal lines 166, an electrode position control signal line 168, and fluid lines 170. These lines may be incorporated into the rotating sleeve 150 or a similar device.

The EDM tool head 162 includes an electrode 172 positioned between two electrode positioning arms 174. An electrical system and electrode position controller 176 receives signals from the high voltage signal lines 166 and the electrode position control signal line 168. The signal from the electrode position control signal line 168 is used to adjust the position of the two electrode positioning arms 174. The signals from the high voltage signal lines 166 are applied to the electrode 172, as will be further discussed below.

The EDM tool head 162 also includes a fluid controller 178, which injects fluid through a nozzle 180 and collects it at a drain 182. Preferably, the EDM tool head has a top elastomer seal 184, a bottom elastomer seal 186, and an axial elastomer seal (not shown) to enclose a region of the substrate 160. That is, the electrode 172 is enclosed between the electrical discharge machining tool head 162, the substrate 160, and the elastomer seal 184, 186. Control operations for the tool head may be performed from a controller positioned in the housing 144 or at another location.

As indicated above, the signal from the electrode position control signal line 168 is used to adjust the position of the electrode. The electrode 172 is configured in the shape of the region of the substrate 160 that is to be removed. Prior art techniques are used to determine the location and shape of a region to be removed from a substrate. For example, an eddy current detection probe tool head, an ultrasonic detection probe tool head, or a dye penetrant tool head may be used.

The signals from the high voltage signal lines 166 are applied to the electrode 172 such that the electrode extracts a region of the substrate corresponding to the shape of the electrode. The extracted region is in the form of dust. That is, an electric arc or spark is created between the electrode 172 and the substrate 160. The spark erodes the material in dust form, which is flushed away by the fluid moving from the nozzle 180 to the drain 182. The electrode positioning arms 174 are rapidly moved toward the substrate 160, until a spark occurs, and then they are moved away from the substrate. This process may be repeated thousands of times a second. Although the dust removed with each spark is extremely small, the repetitive action results in a well 190.

The advantage of the EDM tool head 162 is that it provides a precision excavation of the degraded substrate area 160. For example, excavations with a width of as little as ⅛ of an inch are practical using the EDM tool head. This precision excavation means that a minimal amount of material is removed. In the case of CRDM nozzles, the removed material is radioactive, thus it is important to minimize the amount of material that is removed. Another advantage of the EDM tool head 162 is that the material removed is in the form of dust, not a molten metal. It is relatively easy to process the dust with the fluid controller 178.

The excavated area or well 190 is then reconstructed by filling the cavity with a corrosion resistant welding alloy. Preferably, the filler metal is Inconel Alloy 52 produced by the International Nickel Company. This metal has excellent compatibility with Alloy 600, which is widely used in pressurized water reactors.

Figure 7:
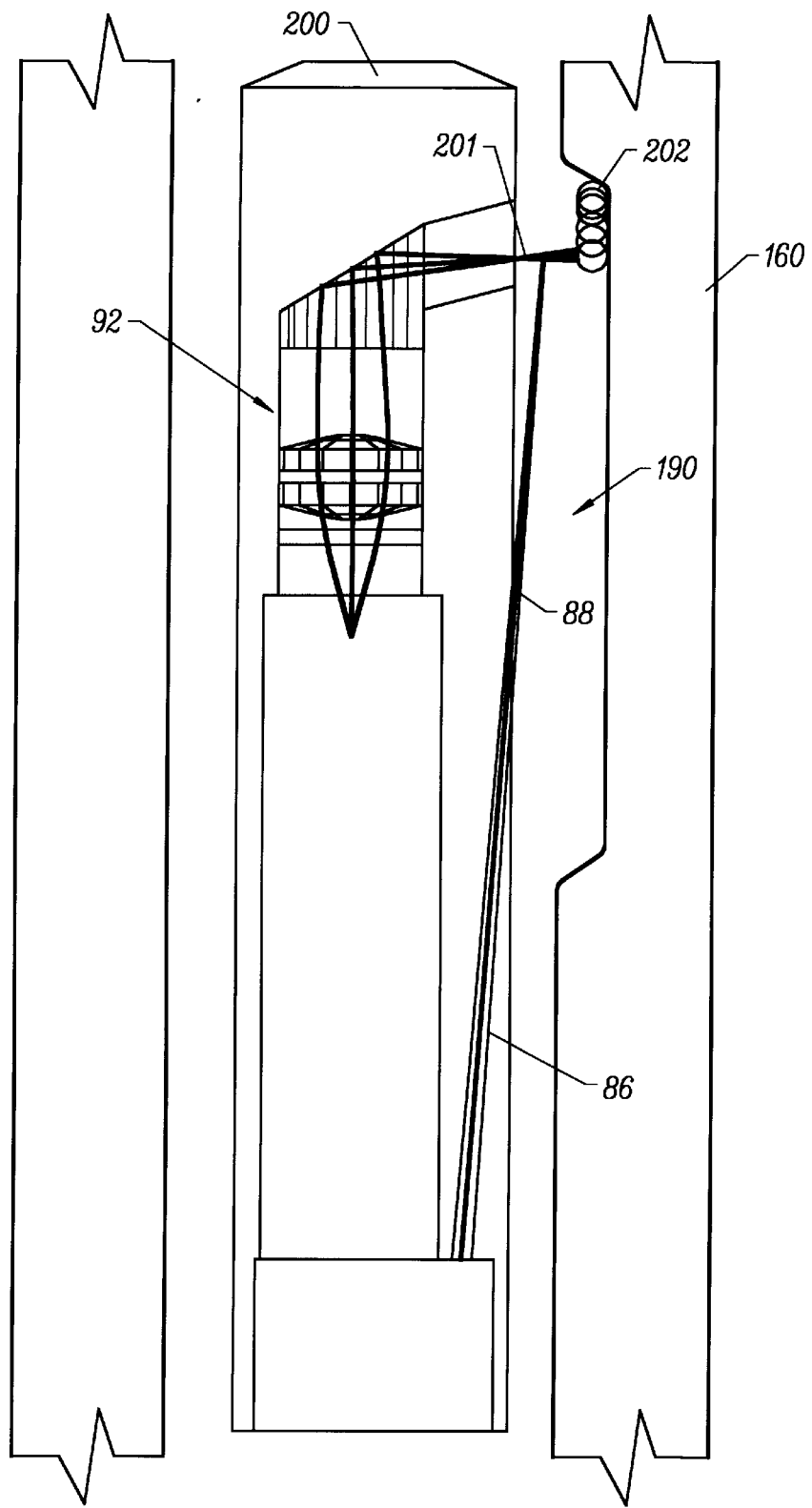
FIG. 7 illustrates a laser reconstruction welding tool head used in accordance with an embodiment of the invention.

FIG. 7 illustrates a laser welding tool head 200. The tool head 200 may be positioned at the top of the rotating apparatus 142 of FIG. 5. The device preferably includes a laser energy directional modification assembly 92 for focusing laser energy 201 into the well 190. A filler passage 86 with a filler wire 88 is preferably provided, which allows the filler wire 88 to intersect with the laser energy 201 to produce a reconstruction weld 202. The term "reconstruction weld" is used to denote that the weld is performed in a well and results in a substrate substantially at its original thickness. This term stands in contrast to the term "clad weld", which implies that the deposited metal is placed on an un-excavated substrate and results in an increase in the original thickness of the substrate.

Advantageously, the laser reconstruction welding approach of the invention allows a precision reconstruction weld that is as little as ⅛ of an inch. Prior art electric arc welding approaches cannot achieve precision welds of this type. Instead, prior art bulk weldments create significantly higher residual stresses due to the shrinkage upon cooling of the larger volume of weld metal. Since stress is a major factor in stress-corrosion cracking, any method to reduce the residual stress level of a repair weld will assist in extending its service life. The precision welding approach of the invention also eliminates the need for a boring tool head to repair the welded region.

Cracking typically occurs along the axial length of CRDM nozzles. While the rotating apparatus 142 can be used to repair helical excavations, it can also be operated without rotation to repair axial excavations.

In sum, the invention provides precision repairs for thick-walled components susceptible to corrosion, such as a reactor pressure vessel control rod drive mechanism in a pressurized water reactor nuclear power plant. The invention combines a precision electrical discharge machining excavation technique with a precision laser reconstruction welding technique. The tool heads used to achieve these functions are relatively simple to construct. In the case of the laser reconstruction welding tool head, prior art devices may be used. In the case of the electrical discharge machining tool head, a tool head for use in difficult to access geometries, such as control rod drive mechanisms has been described. Advantageously, the EDM tool head does not have to process molten metal. Furthermore, it does not require large motor power, as in the case of a milling, grinding, or cutting tool head.

Since the technique of the invention achieves a precision excavation, less radioactive material needs to be disposed. Further, the precision excavation reduces the welding volume and the amount of filler material required for a repair. The invention reduces the residual stresses and welding distortion resulting from a weld repair. The technique also provides corrosion protection to prevent future degradation.

Since the invention entails precision excavation and welding, the original thickness of the substrate is maintained. In other words, the excavation and welding operations do not result in build-up of the substrate. Prior art techniques can be used to excavate, melt, or weld a surface. For example, prior art arc welding techniques may be used for excavation and welding. However, such techniques do not provide the precise wall thickness tolerance, as afforded by the present invention.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A method of repairing a substrate, said method comprising the steps of:

excavating, with an electrical discharge machining operation, a well in a substrate that is ½ inch or thicker;

delivering a wire to said well; and routing laser energy to said well, such that said laser energy intersects with said wire to produce a reconstruction weld in said well, said reconstruction weld being formed without having to melt said substrate.

2. The method of claim 1 wherein said excavating step includes the step of excavating a well as small as ⅛ of an inch wide.

3. The method of claim 2 wherein said delivering step and said routing step result in a reconstruction weld as small as ⅛ of an inch wide.

4. The method of claim 1 wherein said excavating step includes the step of excavating a well in a reactor pressure vessel control rod drive mechanism nozzle.

5. The method of claim 1 further comprising the following steps performed prior to said excavating step:

identifying the shape of a region within a substrate to be repaired;

configuring an electrode to correspond to the shape of said region; and positioning said electrode in an electrical discharge machine.

6. An apparatus for repairing a substrate, comprising:

a tool delivery system;

an electrical discharge machining tool head positionable on said tool delivery system to excavate a well in a substrate, wherein said electrical discharge machining tool head includes an elastomer seal for contacting said substrate, such that an electrode of said electrical discharge machining tool head is enclosed between said electrical discharge machining tool head, said substrate, and said elastomer seal; and a laser reconstruction welding tool head positionable on said tool delivery system to deliver a wire and laser energy to said well, such that a reconstruction weld is formed in said well, said reconstruction weld being formed without having to melt said substrate.

7. The apparatus of claim 6 wherein said electrical discharge machining tool head is connected to an electrical discharge machining tool arm positionable on said tool delivery system, said electrical discharge machining tool arm including high voltage signal lines, fluid lines, and an electrode position control signal line.

8. The apparatus of claim 7 wherein said electrical discharge machining tool head includes an electrical system and electrode position controller responsive to signals received from said high voltage signal lines and said electrode position control signal line, and a fluid controller connected to said fluid lines.

9. The apparatus of claim 8 wherein said electrical system and electrode position controller includes electrode positioning arms supporting said electrode.

10. The apparatus of claim 9 wherein said fluid controller injects fluid across said electrode.

11. The apparatus of claim 6 wherein said laser reconstruction welding tool head includes a laser energy directional modification assembly to direct said laser energy to said well; and a filler passage to direct said wire to said well.

* * * * *